(12) United States Patent
Shrestha et al.

(10) Patent No.: US 11,723,017 B2
(45) Date of Patent: Aug. 8, 2023

(54) UPLINK (UL) RESOURCE ALLOCATION FOR A MEDIUM ACCESS CONTROL (MAC) CONTROL ELEMENT (CE)

(71) Applicant: QUALCOMM Incorporated, San Diego, CA (US)

(72) Inventors: Bharat Shrestha, San Diego, CA (US); Liangping Ma, San Diego, CA (US); Ayan Sengupta, San Diego, CA (US); Umesh Phuyal, San Diego, CA (US); Changhwan Park, San Diego, CA (US); Xiao Feng Wang, San Diego, CA (US); Alberto Rico Alvarino, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/392,955

(22) Filed: Aug. 3, 2021

(65) Prior Publication Data

US 2023/0039127 A1    Feb. 9, 2023

(51) Int. Cl.

| | |
|---|---|
| *H04W 72/1263* | (2023.01) |
| *H04W 72/566* | (2023.01) |
| *H04W 72/21* | (2023.01) |
| *H04L 1/1812* | (2023.01) |
| *H04W 56/00* | (2009.01) |
| *H04W 72/0453* | (2023.01) |
| *H04W 74/08* | (2009.01) |
| *H04W 80/02* | (2009.01) |

(52) U.S. Cl.
CPC ....... *H04W 72/1263* (2013.01); *H04L 1/1812* (2013.01); *H04W 56/005* (2013.01); *H04W 72/0453* (2013.01); *H04W 72/21* (2023.01); *H04W 72/569* (2023.01); *H04W 74/0841* (2013.01); *H04W 80/02* (2013.01)

(58) Field of Classification Search
CPC .......... H04W 72/1263; H04W 56/005; H04W 72/0453; H04W 72/1242; H04W 72/1284; H04W 74/0841; H04W 80/02; H04L 1/1812

See application file for complete search history.

(56) References Cited

U.S. PATENT DOCUMENTS

| | | | |
|---|---|---|---|
| 2020/0244414 A1* | 7/2020 | Takahashi | ............. H04L 5/0094 |
| 2020/0267797 A1* | 8/2020 | Wei | ....... H04B 7/0695 |
| 2021/0144762 A1 | 5/2021 | Tsai et al. | |

(Continued)

FOREIGN PATENT DOCUMENTS

WO    2020247797 A1    12/2020

OTHER PUBLICATIONS

3GPP TS 38.321 V15.7.0 (Year: 2019).*

(Continued)

*Primary Examiner* — Yu-Wen Chang
(74) *Attorney, Agent, or Firm* — Patterson + Sheridan, LLP

(57) ABSTRACT

Certain aspects of the present disclosure provide techniques for wireless communications by a user equipment (UE). The UE detects one or more conditions are met for transmitting a medium access control (MAC) control element (CE) providing assistance information to a network entity for scheduling. In response to the detection, the UE then takes one or more actions to obtain uplink (UL) resources for transmitting the MAC CE.

32 Claims, 8 Drawing Sheets

(56) References Cited

U.S. PATENT DOCUMENTS

| | | | |
|---|---|---|---|
| 2021/0203400 A1 | 7/2021 | Babaei | |
| 2021/0297959 A1* | 9/2021 | Zhou | H04W 72/535 |
| 2022/0086780 A1* | 3/2022 | Tsai | H04W 56/006 |
| 2022/0124795 A1* | 4/2022 | Wu | H04B 7/185 |
| 2022/0159568 A1* | 5/2022 | Kim | H04W 72/1284 |
| 2022/0217781 A1* | 7/2022 | Decarreau | H04W 74/0833 |
| 2022/0240282 A1* | 7/2022 | Shi | H04L 5/001 |
| 2022/0272738 A1* | 8/2022 | Liu | H04L 1/188 |

OTHER PUBLICATIONS

Ericsson Apple: "Reporting Information About UE Specific TA Pre-Compensation", 3GPP TSG-RAN WG2 #114e, R2-2106090, 3rd Generation Partnership Project (3GPP), Mobile Competence Centre, 650, Route Des Lucioles, F-06921 Sophia-Antipolis Cedex, France, vol. RAN WG2, No. Electronic Meeting, May 10, 2021 May 10, 2021, XP052007459, 10 Pages, figures 2, 3, 4 Sections: 2.1, 2.3, p. 1-p. 5 sections: 2.6, 3, p. 6-p. 10.

International Search Report and Written Opinion—PCT/US2022/074358—ISA/EPO—dated Oct. 25, 2022.

Qualcomm Incorporated: "Procedure and Format for Beam Index Indication MAC CE", 3GPP TSG-RAN WG2 Meeting #107, R2-1911504, 3rd Generation Partnership Project (3GPP), Mobile Competence Centre, 650, Route Des Lucioles, F-06921 Sophia-Antipolis Cedex, France, vol. RAN WG2, No. Prague, Czech, Aug. 26, 2019-Aug. 30, 2019, Aug. 23, 2019, XP051769258, 4 Pages, sections: 2, 3, p. 1-p. 3.

* cited by examiner

500

A method for wireless communications by a network entity

510

Receive a medium access control (MAC) control element (CE) indicating a user equipment (UE) has detected that one or more conditions are met, the MAC CE providing assistance information comprising at least one of a timing advance (TA) report or information regarding potential hybrid automatic repeat request (HARQ) issues for scheduling

520

Allocate uplink (UL) resources based on the MAC CE with the assistance information

*FIG. 5*

UPLINK (UL) RESOURCE ALLOCATION FOR A MEDIUM ACCESS CONTROL (MAC) CONTROL ELEMENT (CE)

INTRODUCTION

Aspects of the present disclosure relate to wireless communications, and more particularly, to techniques for uplink (UL) resource allocation for a medium access control (MAC) control element (CE).

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a user equipment (UE), including: detecting one or more conditions are met for transmitting a medium access control (MAC) control element (CE) providing assistance information to a network entity for scheduling; and taking one or more actions to obtain uplink (UL) resources for transmitting the MAC CE, in response to the detection.

Another aspect provides a method for wireless communications by a network entity, including: receiving a MAC CE indicating a UE has detected that one or more conditions are met, the MAC CE providing assistance information comprising at least one of a TA report or information regarding potential HARQ issues for scheduling; and allocating UL resources, based on the MAC CE with the assistance information.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 5 depicts a flow diagram illustrating example operations for wireless communication by a network entity.

DETAILED DESCRIPTION

Aspects of the present disclosure provide apparatuses, methods, processing systems, and computer-readable mediums for triggering uplink (UL) resource allocation for a medium access control (MAC) control element (CE) in order for a user equipment (UE) to provide assistance information to a network entity for UL scheduling.

For example, the UE may trigger UL resource allocation in order to send a timing advance (TA) report MAC CE and/or a hybrid automatic repeat request (HARQ) feedback MAC CE to a network entity. When certain conditions are met, the UE may trigger a scheduling request (SR) and/or a two-step random access channel (RACH) procedure to obtain resources for transmission of the TA report MAC CE and/or the HARQ feedback MAC CE. Based on the SR or RACH procedure, the network entity may then allocate UL resources allowing the UE to transmit the TA report MAC CE and/or HARQ feedback MAC CE.

Introduction to Wireless Communication Networks

Figure 1:
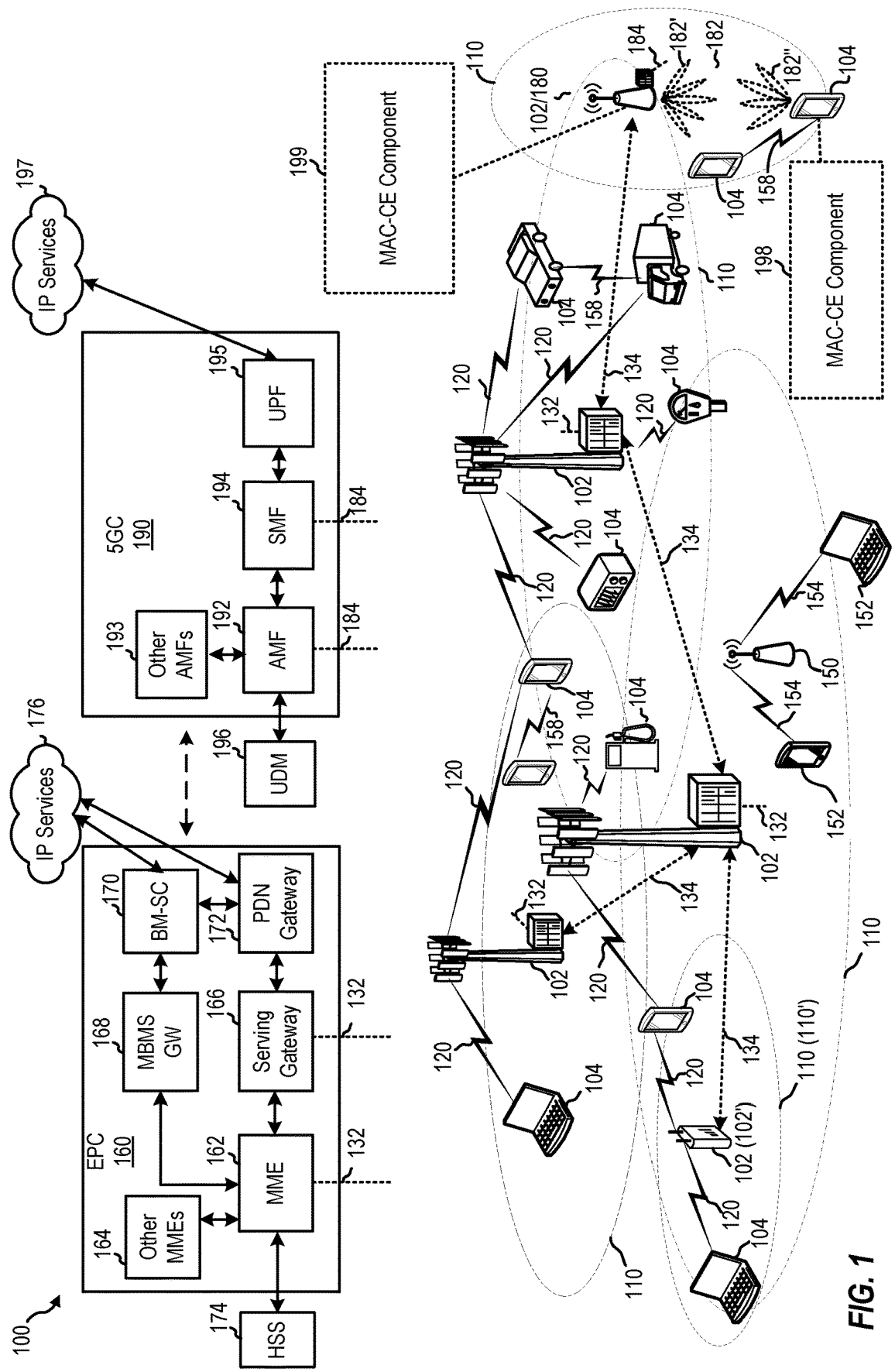
FIG. 1 is a block diagram conceptually illustrating an example wireless communication network.

FIG. 1 depicts an example of a wireless communication network 100, in which aspects described herein may be implemented.

For example, wireless communication network 100 may include a medium access control (MAC) control element (CE) component 199, which may be configured to perform, or cause a base station (BS) 102 to perform, operations 500 of FIG. 5. Wireless communication network 100 may also include a MAC CE component 198, which may be configured to perform, or cause a user equipment (UE) 104 to perform, operations 400 of FIG. 4.

Generally, wireless communication network 100 includes BSs 102, UEs 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs 102 may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

BSs 102 wirelessly communicate with UEs 104 via communications links 120. Each of BSs 102 may provide communication coverage for a respective geographic coverage area 110, which may overlap in some cases. For example, small cell 102' (e.g., a low-power BS) may have a coverage area 110' that overlaps the coverage area 110 of one or more macrocells (e.g., high-power BSs).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain BSs 102 may utilize beamforming 182 with a UE 104 to improve path loss and range. For example, the BS 102 and the UE 104 may each include a plurality of antennas, such as antenna elements, antenna panels, and/or antenna arrays to facilitate the beamforming.

In some cases, a BS 102 may transmit a beamformed signal to a UE 104 in one or more transmit directions 182'. The UE 104 may receive the beamformed signal from the BS 102 in one or more receive directions 182". The UE 104 may also transmit a beamformed signal to the BS 102 in one or more transmit directions 182"'. The BS 102 may also receive the beamformed signal from the UE 104 in one or more receive directions 182'. The BS 102 and the UE 104 may then perform beam training to determine the best receive and transmit directions for each of BS 102 and UE 104. Notably, the transmit and receive directions for the BS 102 may or may not be the same. Similarly, the transmit and receive directions for the UE 104 may or may not be the same.

Figure 2:
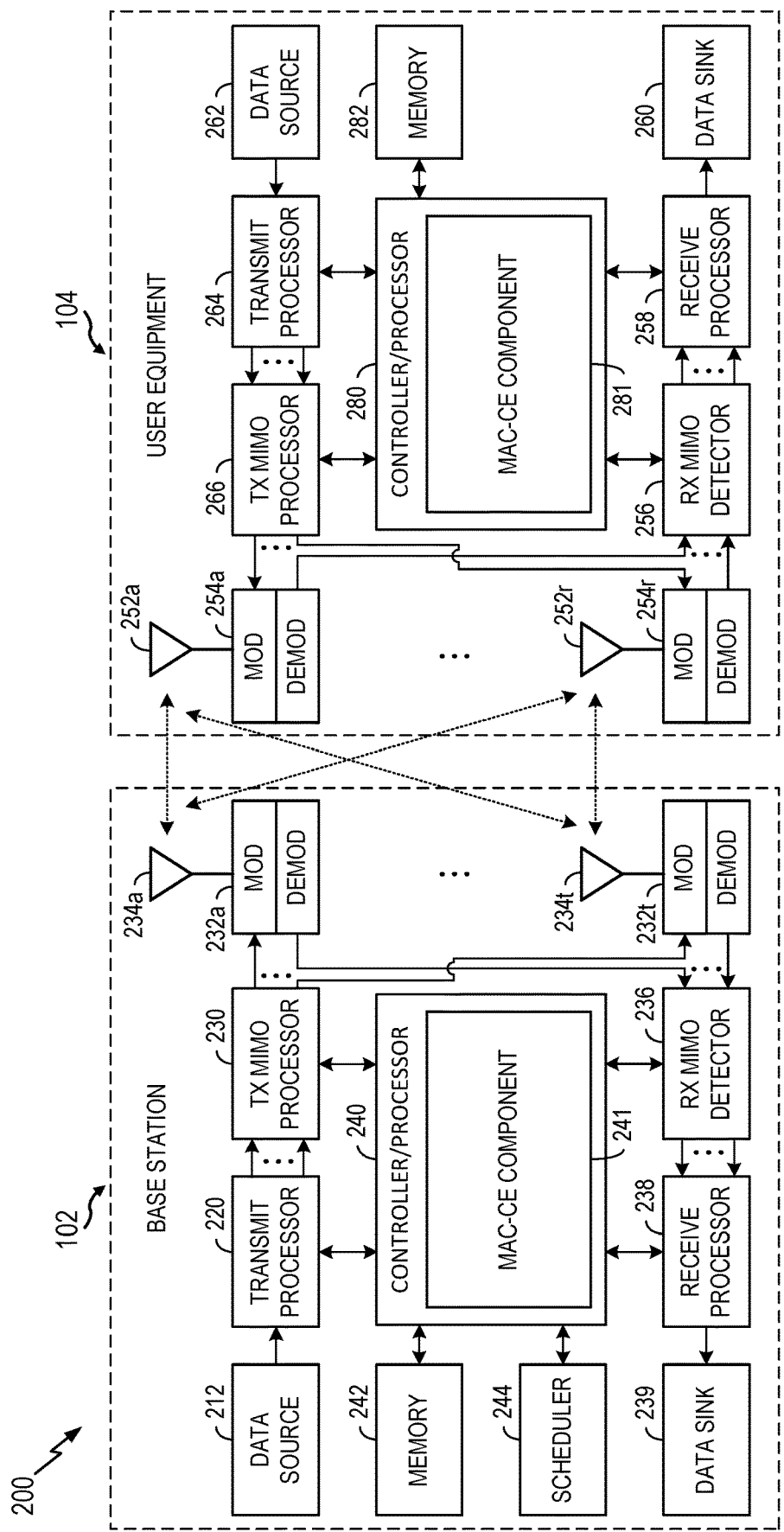
FIG. 2 is a block diagram conceptually illustrating aspects of an example base station (BS) and a user equipment (UE).

FIG. 2 depicts aspects of an example BS 102 and a UE 104.

Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes a MAC CE component 241, which may be representative of a MAC CE component 199 of FIG. 1. Notably, while depicted as an aspect of controller/processor 240, the MAC CE component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

UE 104 includes controller/processor 280, which may be configured to implement various functions related to wireless communications. In the depicted example, controller/processor 280 includes a MAC CE component 281, which may be representative of the MAC CE component 198 of FIG. 1. Notably, while depicted as an aspect of controller/processor 280, the MAC CE component 281 may be implemented additionally or alternatively in various other aspects of UE 104 in other implementations.

Figure 3:
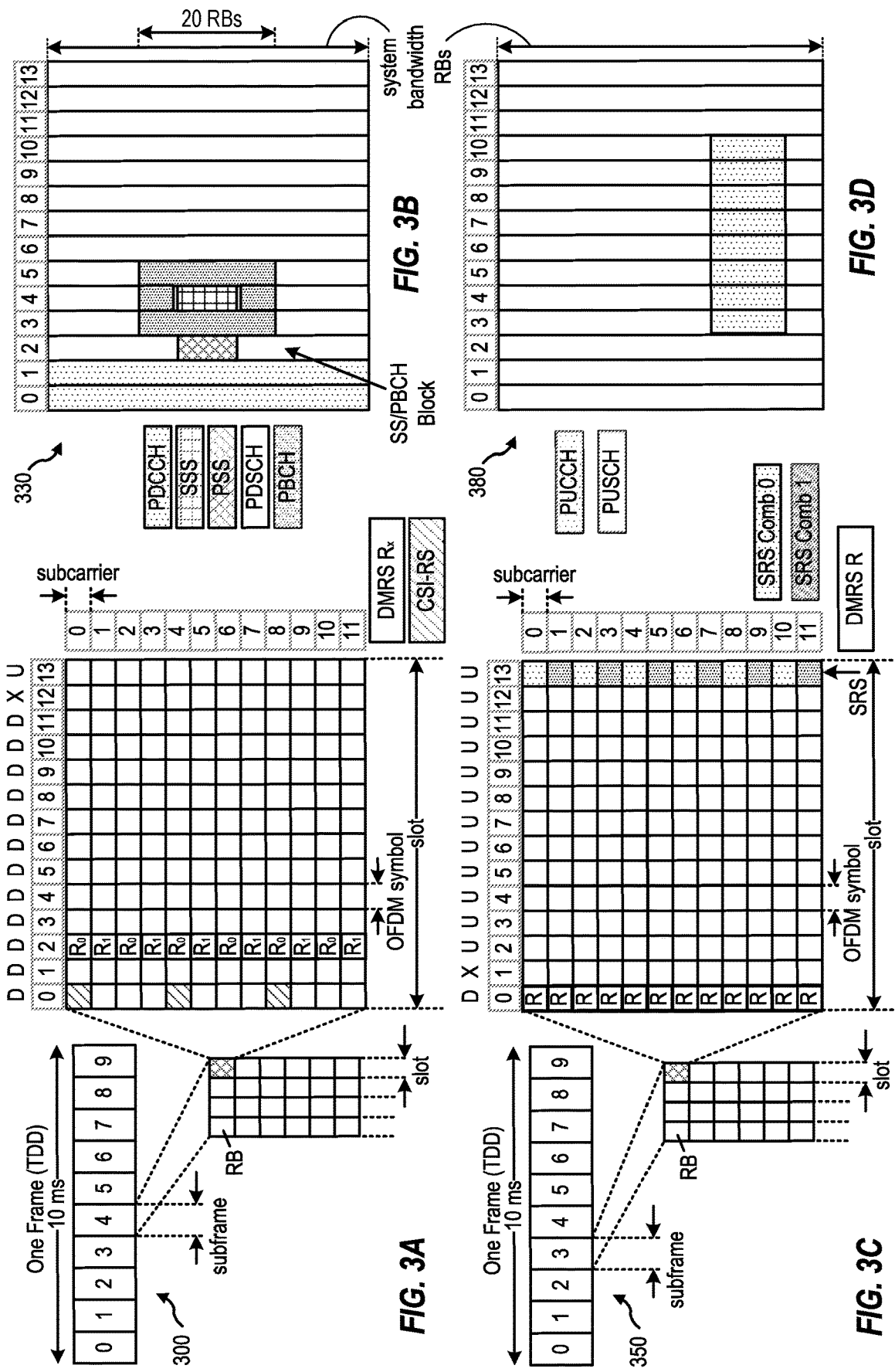
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Overview of Medium Access Control (MAC) Control Element (CE) and Scheduling Request (SR)

In new radio (NR) and long term evolution (LTE), when a user equipment may trigger a buffer status report (BSR) medium access control (MAC) control element (CE), and no uplink (UL) scheduling resource is available for a new transmission (or the UL scheduling resource available for the new transmission do not meet logical channel prioritization (LCP) mapping restrictions), a scheduling request (SR) may be triggered. This is because when the UE triggers the BSR MAC CE, the UE must have UL data in a radio bearer to transmit to a network entity (since the BSR may indicate information about an amount of pending UL data in a buffer of the UE). After receiving the SR, the network entity will grant UL resources to the UE for performing UL transmissions. In some cases, the BSR MAC CE may not directly trigger a two-step random access channel (RACH) procedure (i.e., without triggering the SR).

The UE may trigger the SR in several other instances. In one example, when the UE may detect consistent listen before talk (LBT) failures (e.g., in a context of NR unlicensed (NR-U)), the UE may have to send a LBT failure MAC CE to the network entity to report the consistent LBT failures. If an UL scheduling resource is not available or if UL scheduling resource is available but the LBT failure MAC CE cannot be accommodated in the UL scheduling resource, the UE may trigger and send the SR to the network entity using a physical uplink control channel (PUCCH) resource. The network entity then grants UL resources to the UE based on the SR.

In another example, when the UE may trigger reporting of sidelink (SL) channel state information (CSI) (e.g., in context of SL communications), the SR may be triggered and the network entity then grants UL resources to the UE.

In another example, when the UE may trigger a beam measurement report MAC CE, the UE may also trigger the SR (e.g., when there are no UL scheduling resources available for new transmissions or re-transmissions). The network entity then grants UL resources based on the SR.

Usually, any other MAC CE alone (except for the MAC CEs noted above) may not trigger an SR. This is because the UE may only send the MAC CE to the network entity when UL scheduling resources are available. In some cases, there may also be a need to specify whether or not each MAC CE may trigger the SR.

The UE may use MAC CEs for sending different types of information to a network entity. In one example, when the UE may have to send timing misalignment information to the network entity, the UE may use a timing advance (TA) report MAC CE to send the timing misalignment information to the network entity. In another example, when the UE may have to send a hybrid automatic repeat request (HARQ) feedback to the network entity, the UE may use a HARQ feedback MAC CE to report HARQ issues (e.g., especially when HARQ retransmission may be disabled) to the network entity.

The TA report MAC CE and the HARQ feedback MAC CE may not be able to request any UL scheduling resources on their own, but the TA report MAC CE and the HARQ feedback MAC CE may be useful for UL scheduling by the network entity. So, it may be essential for the UE to update the network entity on a current timing advance value (e.g., using the TA report MAC CE) or a status of HARQ issues (e.g., using the HARQ feedback MAC CE). Therefore, the UE may need to transmit the TA report MAC CE and the HARQ feedback MAC CE to the network entity. In some cases, when there may no UL scheduling resources available for new transmissions or re-transmissions, the UE may also need to trigger the SR.

Aspects Related to Uplink (UL) Resource Allocation for a Medium Access Control (MAC) Control Element (CE)

Aspects of the present disclosure provide apparatuses, methods, processing systems, and computer-readable mediums for triggering uplink (UL) resource allocation for a medium access control (MAC) control element (CE) in order for a user equipment (UE) to provide assistance information to a network for UL scheduling.

For example, as noted above, the UE may trigger a scheduling request (SR) and/or a two-step random access channel (RACH) procedure based on MAC CEs (e.g., a timing advance (TA) report MAC CE and/or a hybrid automatic repeat request (HARQ) feedback MAC CE) and a logical channel prioritization (LCP) of the MAC CEs. Based on the SR or RACH procedure, a network entity may allocate UL resources for the UE for transmitting the (TA report and/or HARQ feedback) MAC CE.

Figure 4:
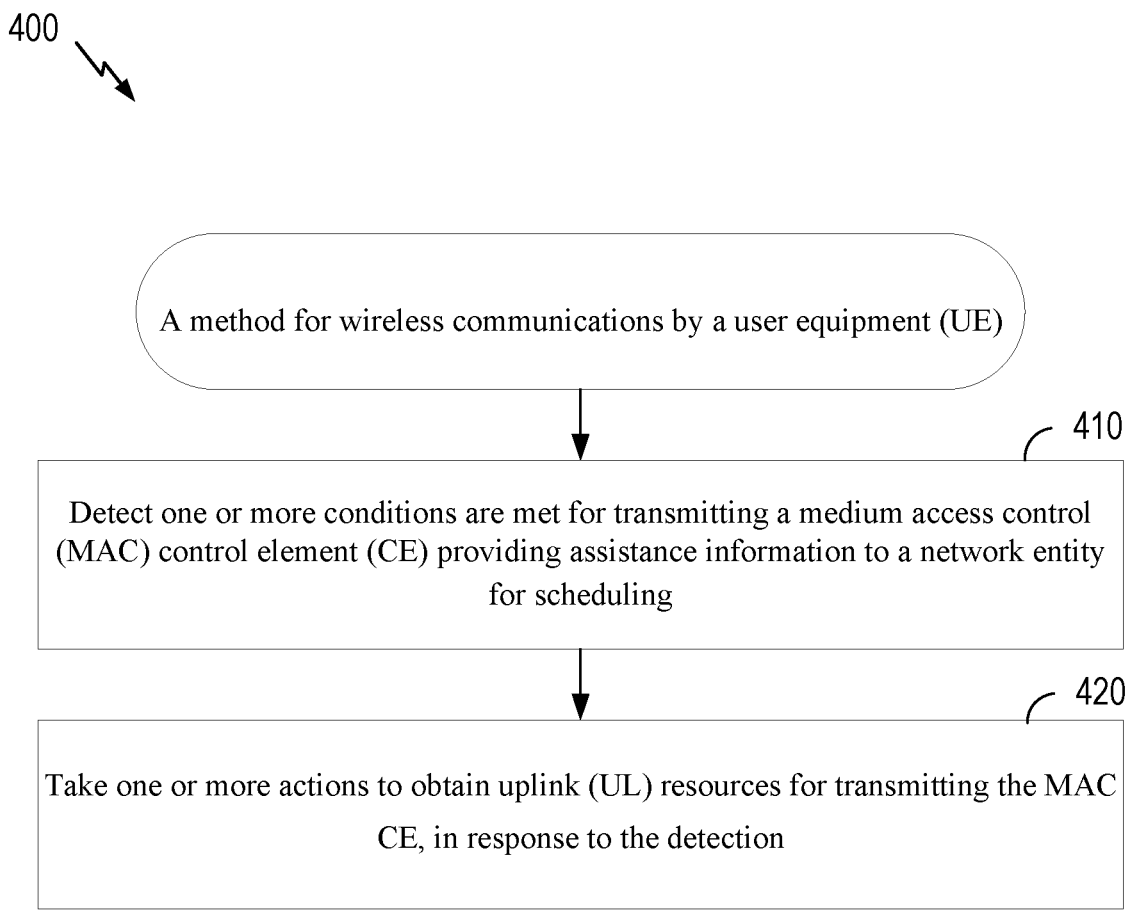
FIG. 4 depicts a flow diagram illustrating example operations for wireless communication by a UE.

FIG. 4 depicts a flow diagram illustrating example operations 400 for wireless communication. The operations 400 may be performed, for example, by a UE (e.g., such as the UE 104 in the wireless communication network 100 of FIG. 1). The operations 400 may be implemented as software components that are executed and run on one or more processors (e.g., the controller/processor 280 of FIG. 2). Further, transmission and reception of signals by the UE in operations 400 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 400 begin, at 410, by detecting one or more conditions are met for transmitting a MAC CE providing assistance information to a network entity for scheduling. For example, the UE may detect that the one or more conditions are met for transmitting the MAC CE providing the assistance information using a processor, antenna(s), and/or transceiver components of the UE 104 shown in FIG. 1 or FIG. 2 and/or of the apparatus shown in FIG. 7.

At 420, the UE takes one or more actions to obtain UL resources for transmitting the MAC CE, in response to the detection. The UE may take the one or more actions to obtain the UL resources using a processor, antenna(s), and/or transceiver components of the UE 104 shown in FIG. 1 or FIG. 2 and/or of the apparatus shown in FIG. 7.

FIG. 5 is a flow diagram illustrating example operations 500 for wireless communication. The operations 500 may be performed, for example, by a network entity (e.g., such as the BS 102 in the wireless communication network 100 of FIG. 1). The operations 500 may be implemented as software components that are executed and run on one or more processors (e.g., the controller/processor 240 of FIG. 2). Further, transmission and reception of signals by the network entity in operations 500 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 500 begin, at 510, by receiving a MAC CE indicating a UE has detected that one or more conditions are met. The MAC CE provides assistance information comprising at least one of a TA report or information regarding potential HARQ issues for scheduling. For example, the network entity may receive the MAC CE providing the assistance information for the scheduling from the UE using antenna(s) and receiver/transceiver components of the BS 102 shown in FIG. 1 or FIG. 2 and/or of the apparatus shown in FIG. 8.

At 520, the network entity allocates UL resources based on the MAC CE with the assistance information. For example, the network entity may allocate the UL resources using a processor, antenna(s) and/or transceiver components of the BS 102 shown in FIG. 1 or FIG. 2 and/or of the apparatus shown in FIG. 8.

Figure 6:
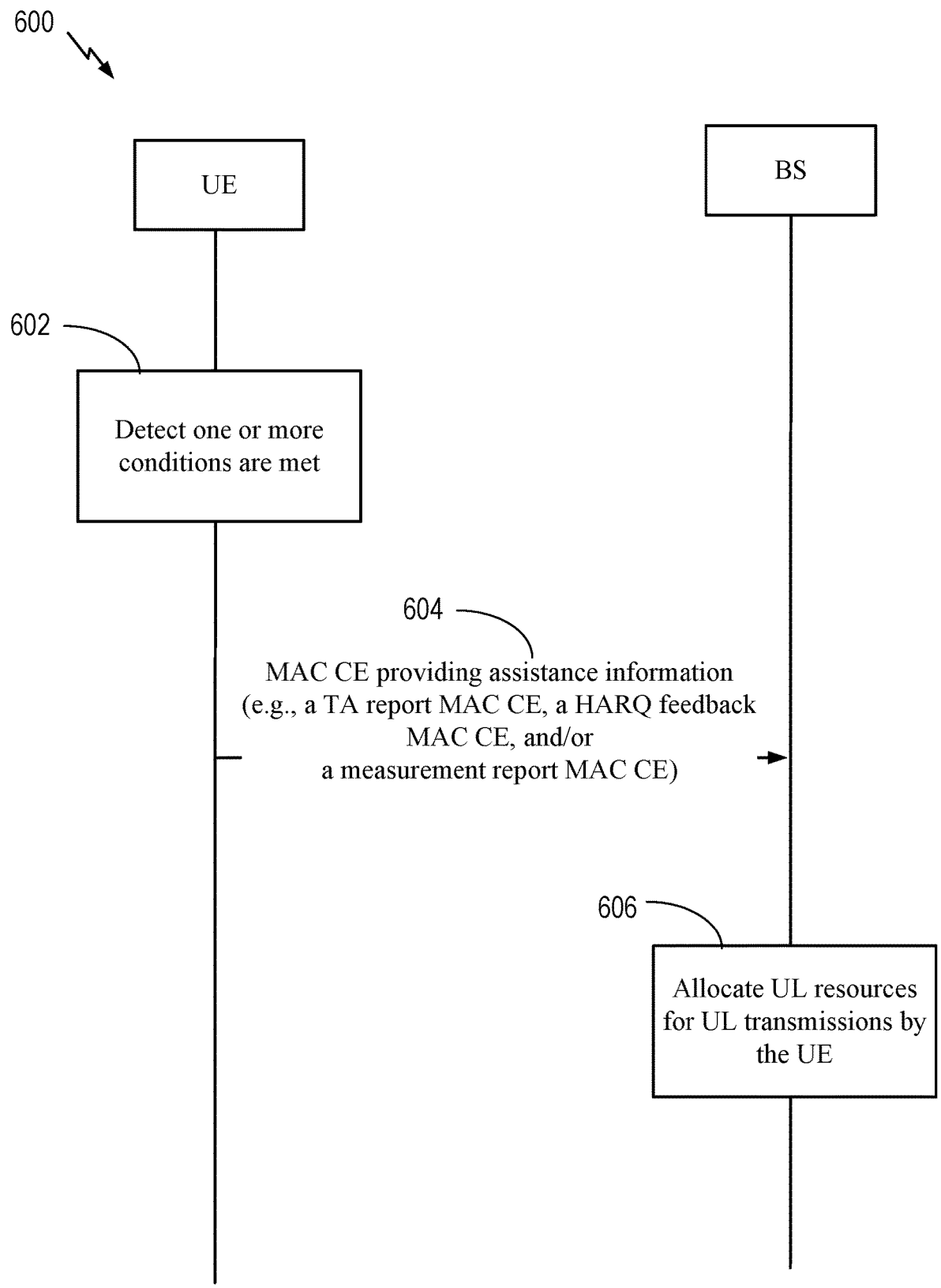
FIG. 6 depicts a call flow diagram illustrating example signaling for allocating (UL) resources.

The operations shown in FIGS. 4 and 5 may be understood with reference to the call flow diagram of FIG. 6.

As illustrated in FIG. 6, at 602, a UE (e.g., the UE 104 shown in FIG. 1 or FIG. 2) may detect that one or more conditions are met for transmitting a MAC CE providing assistance information to a BS (e.g., the BS 102 shown in FIG. 1 or FIG. 2) for scheduling.

As one example, the assistance information may include a TA report (e.g., timing misalignment information). In another example, the assistance information may include information regarding potential HARQ issues (e.g., HARQ retransmission is disabled). As another example, the assistance information may include a measurement report (e.g. different signal strength measurements).

At 604, the UE may transmit the MAC CE providing the assistance information (e.g., a TA report MAC CE and/or a HARQ feedback MAC CE) to the BS. In certain aspects, when the one or more conditions (e.g., SR conditions) are met, triggering of the transmission of the MAC CE providing the assistance information may trigger an SR.

In one example, the SR conditions may be met when a buffer status report (BSR) may be triggered via a logical channel associated with a highest priority or a lowest priority (i.e., the UE meets the same conditions for triggering the SR when a regular BSR is triggered).

In another example, the SR conditions may be met when a dynamic UL resource (e.g., a dynamic UL scheduling resource) is not available. In other words, if available, the dynamic UL resource could be used to send the MAC CE without the need to request additional UL resources.

In another example, the SR conditions may be met when a configured UL resource (e.g., a configured UL scheduling resource) is not available. In other words, if available, the configured UL resource could be used to send the MAC CE without the need to request additional UL resources.

In another example, the SR conditions may be met when a two-step RACH UL resource (e.g., a two-step RACH UL scheduling resource) is not available.

In another example, the SR conditions may be met when an SR configuration for the MAC CE is configured. In some cases, a physical uplink control channel (PUCCH) occasion for the SR configuration associated with the MAC CE may be one half round trip time (RTT) earlier than an available UL resource. In some cases, a PUCCH occasion for the SR configuration associated with the MAC CE may be one RTT earlier than an available UL resource (the UL resource may be considered not to be available if the PUCCH occasion for the SR configuration is one RTT earlier than the available UL resource).

In certain aspects, the UE may trigger a two-step RACH procedure based on the triggering of the transmission of the MAC CE with the assistance information (e.g., the TA report MAC CE, the HARQ feedback MAC CE, and/or a measurement report MAC CE) when the one or more conditions (e.g., RACH conditions) are met.

In one example, the RACH conditions may be met when the two-step RACH procedure is configured in an active bandwidth part (BWP). In another example, the RACH conditions may be met when the two-step RACH procedure is configured in a default BWP. In another example, the RACH conditions may be met when an available UL resource (e.g., UL scheduling resource) occasion is one half RTT later than a two-step RACH physical uplink shared channel (PUSCH) occasion. In another example, the RACH conditions may be met when the available UL resource occasion is one RTT later than a two-step RACH PUSCH occasion. In another example, the RACH conditions may be met if a TA time alignment timer expires before an available UL occasion. In another example, the RACH conditions may be met if the UE may lose synchronization before an available UL scheduling occasion (e.g., a TA time alignment timer expires before an available UL occasion).

In another example, the RACH conditions may be met when a PUCCH resource for an SR configuration is not configured in an active BWP, and the two-step RACH procedure is configured in the active BWP or a default BWP.

In another example, the RACH conditions may be met when an SR is triggered, a PUCCH resource for an SR configuration is not configured in an active BWP, a four-step RACH procedure is configured in the active BWP or a default BWP, the two-step RACH procedure is configured in the active BWP or the default BWP, and the four-step RACH procedure is selected based on a selection criteria corresponding to different types of a RACH (i.e., the four-step RACH procedure is selected based on a RACH type selection criteria).

In another example, the RACH conditions may be met when an SR is triggered, a PUCCH resource for an SR configuration is available, the two-step RACH procedure is configured in an active BWP or a default BWP, the PUCCH resource for the SR configuration that is associated with a logical channel having a lowest priority is not available, the PUCCH resource for the SR configuration that is associated with a logical channel having a highest priority is not available, and a MAC entity is configured with the SR configuration for the MAC CE and the PUCCH resource for the SR configuration associated with the MAC CE is not available.

At 606, the BS may allocate UL resources for UL transmissions by the UE, in response to the SR that is triggered based on the MAC CE providing the assistance information.

In certain aspects, a MAC CE providing assistance information (e.g., a TA report MAC CE, a HARQ feedback MAC CE, or a measurement report MAC CE) may be configured with a LCP. In some cases, when a UE may need to send multiple MAC CEs and limited UL resources are available, the UE may send the MAC CEs based on their corresponding LCP.

In one example, the MAC CE with the assistance information may have a lower priority than a cell radio network temporary identifier (C-RNTI) MAC CE (i.e., a highest priority may be provided for the C-RNTI MAC CE), based on the LCP of the MAC CEs. In some cases, when the UE may need to send the C-RNTI MAC CE and the MAC CE with the assistance information, but limited UL resources are available, the UE may send the C-RNTI MAC CE.

In another example, the MAC CE with the assistance information may have a lower priority than data from an UL common control channel (UL-CCCH) (i.e., a highest priority may be provided for the data from the UL-CCCH), based on the LCP of the MAC CEs. In some cases, when the UE may need to send the data from the UL-CCCH and the MAC CE with the assistance information, but limited UL resources are available, the UE may send the data from the UL-CCCH.

In another example, the MAC CE with the assistance information may have one step lower priority than the data from UL-CCCH, based on the LCP of the MAC CEs.

In another example, the MAC CE with the assistance information may have a higher priority than all other MAC CEs except a C-RNTI MAC CE, based on the LCP of the MAC CEs. In some cases, when the UE may need to send the MAC CE with the assistance information and some other MAC CE, but limited UL resources are available, the UE may send the MAC CE with the assistance information.

In another example, the MAC CE with the assistance information may have a higher priority than data from all logical channels except data from an UL-CCCH, based on the LCP of the MAC CEs. In some cases, when the UE may need to send the MAC CE with the assistance information and the data from another logical channel, but limited UL resources are available, the UE may send the MAC CE with the assistance information (and at least temporarily drop the data).

In another example, the MAC CE with the assistance information may have a lowest priority among all MAC CEs and logical channels. In this case, the UE may try and fit the MAC CE with the assistance information in an available transport block size (TBS), based on the LCP of the MAC CEs.

Example Wireless Communication Devices

Figure 7:
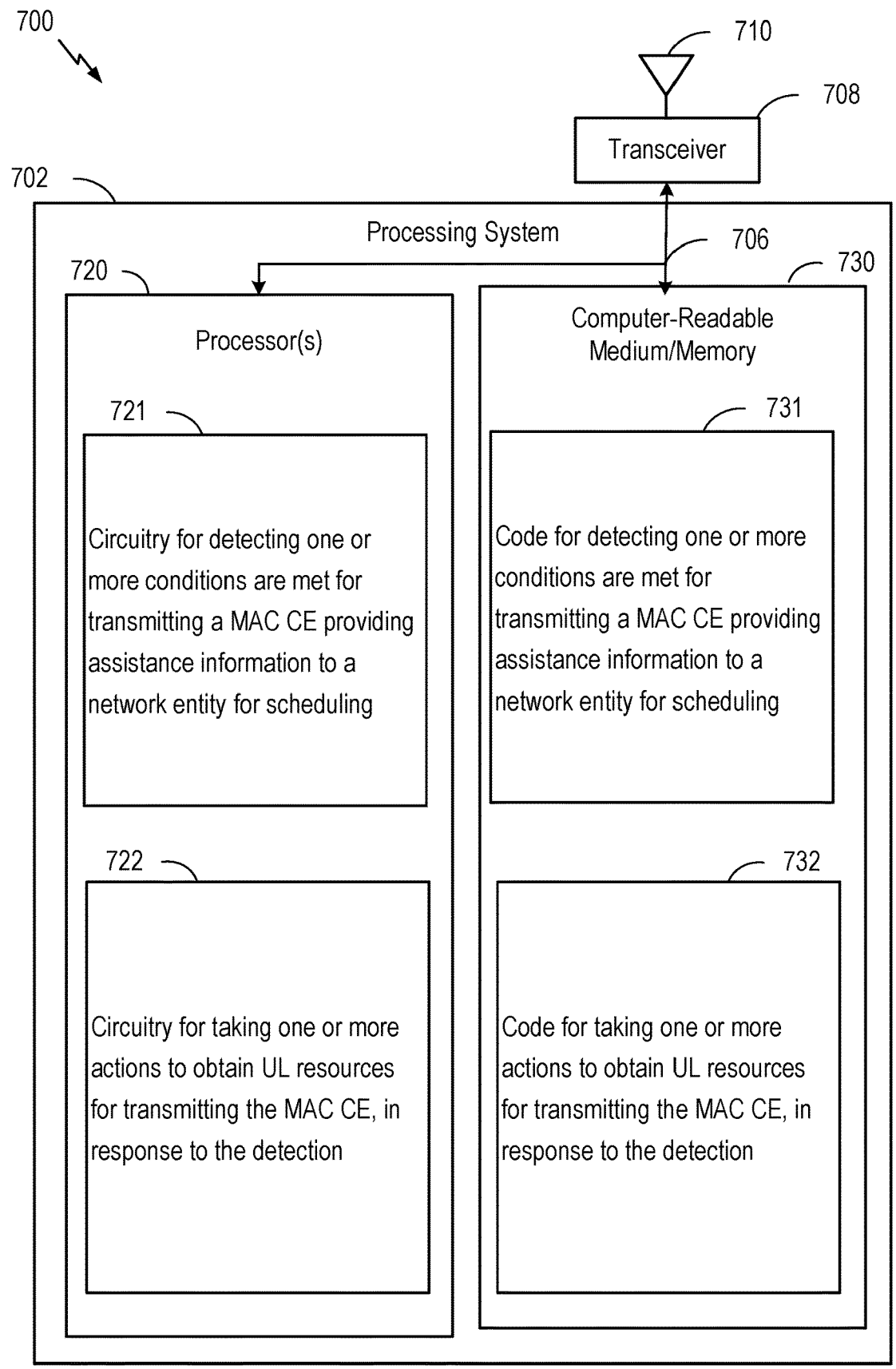
FIG. 7 depicts aspects of an example communications device.

FIG. 7 depicts an example communications device 700 that includes various components operable, configured, or adapted to perform operations for the techniques disclosed herein, such as the operations depicted and described with respect to FIG. 4. In some examples, communication device 700 may be a user equipment (UE) 104 as described, for example with respect to FIGS. 1 and 2.

Communications device 700 includes a processing system 702 coupled to a transceiver 708 (e.g., a transmitter and/or a receiver). Transceiver 708 is configured to transmit (or send) and receive signals for the communications device 700 via an antenna 710, such as the various signals as described herein. Processing system 702 may be configured to perform processing functions for communications device 700, including processing signals received and/or to be transmitted by communications device 700.

Processing system 702 includes one or more processors 720 coupled to a computer-readable medium/memory 730 via a bus 706. In certain aspects, computer-readable medium/memory 730 is configured to store instructions (e.g., computer-executable code) that when executed by the one or more processors 720, cause the one or more processors 720 to perform the operations illustrated in FIG. 4, or other operations for performing the various techniques discussed herein.

In the depicted example, computer-readable medium/memory 730 stores code 731 detecting one or more conditions are met for transmitting a medium access control (MAC) control element (CE) providing assistance information to a network entity for scheduling and code 732 for taking one or more actions to obtain uplink (UL) resources for transmitting the MAC CE in response to the detection.

In the depicted example, the one or more processors 720 include circuitry configured to implement the code stored in the computer-readable medium/memory 730, including circuitry 721 for detecting one or more conditions are met for transmitting a MAC CE providing assistance information to a network entity for scheduling and circuitry 722 for taking one or more actions to obtain UL resources for transmitting the MAC CE in response to the detection.

Various components of communications device 700 may provide means for performing the methods described herein, including with respect to FIG. 4.

In some examples, means for transmitting or sending (or means for outputting for transmission) may include the transceivers 254 and/or antenna(s) 252 of the UE 104 illustrated in FIG. 2 and/or transceiver 708 and antenna 710 of the communication device 700 in FIG. 7.

In some examples, means for receiving (or means for obtaining) may include the transceivers 254 and/or antenna(s) 252 of the UE 104 illustrated in FIG. 2 and/or transceiver 708 and antenna 710 of the communication device 700 in FIG. 7.

In some examples, means for detecting one or more conditions are met for transmitting a MAC CE providing assistance information to a network entity for scheduling and means for taking one or more actions to obtain UL resources for transmitting the MAC CE in response to the detection, may include various processing system components, such as: the one or more processors 720 in FIG. 7, or aspects of the UE 104 depicted in FIG. 2, including receive processor 258, transmit processor 264, TX MIMO processor 266, and/or controller/processor 280 (including MAC CE component 281).

Notably, FIG. 7 is just use example, and many other examples and configurations of communication device 700 are possible.

Figure 8:
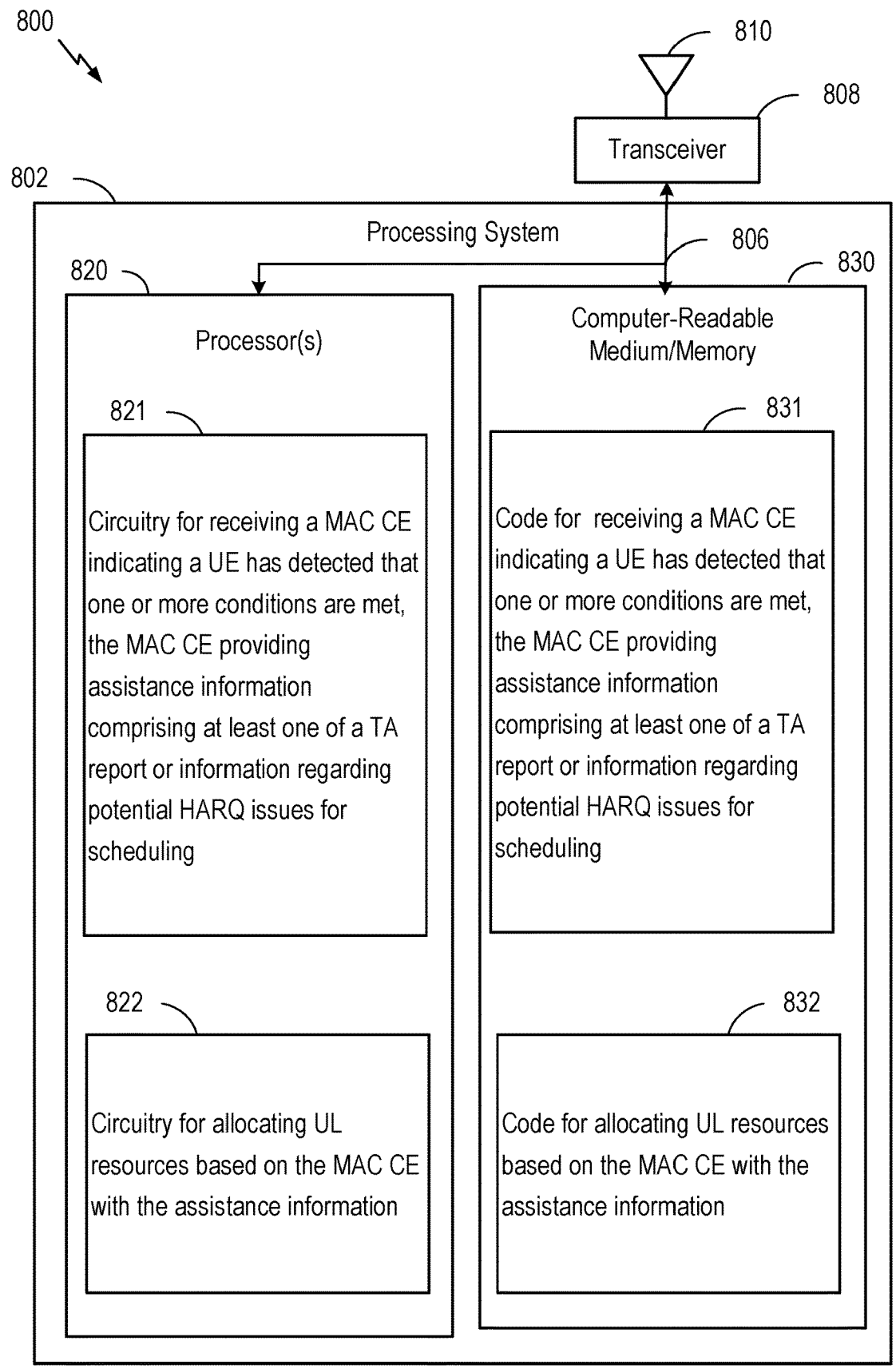
FIG. 8 depicts aspects of an example communications device.

FIG. 8 depicts an example communications device 800 that includes various components operable, configured, or adapted to perform operations for the techniques disclosed herein, such as the operations depicted and described with respect to FIG. 5. In some examples, communication device 800 may be a base station (BS) 102 as described, for example with respect to FIGS. 1 and 2.

Communications device 800 includes a processing system 802 coupled to a transceiver 808 (e.g., a transmitter and/or a receiver). Transceiver 808 is configured to transmit (or send) and receive signals for the communications device 800 via an antenna 810, such as the various signals as described herein. Processing system 802 may be configured to perform processing functions for communications device 800, including processing signals received and/or to be transmitted by communications device 800.

Processing system 802 includes one or more processors 820 coupled to a computer-readable medium/memory 830 via a bus 806. In certain aspects, computer-readable medium/memory 830 is configured to store instructions (e.g., computer-executable code) that when executed by the one or more processors 820, cause the one or more processors 820 to perform the operations illustrated in FIG. 5, or other operations for performing the various techniques discussed herein.

In the depicted example, computer-readable medium/memory 830 stores code 831 for receiving a MAC CE indicating a UE has detected that one or more conditions are met where the MAC CE provides assistance information comprising at least one of a TA report or information regarding potential HARQ issues for scheduling and code 832 for allocating UL resources based on the MAC CE with the assistance information.

In the depicted example, the one or more processors 820 include circuitry configured to implement the code stored in the computer-readable medium/memory 830, including circuitry 821 for receiving a MAC CE indicating a UE has detected that one or more conditions are met where the MAC CE provides assistance information comprising at least one of a TA report or information regarding potential HARQ issues for scheduling and circuitry 822 for allocating UL resources based on the MAC CE with the assistance information.

Various components of communications device 800 may provide means for performing the methods described herein, including with respect to FIG. 5.

In some examples, means for transmitting or sending (or means for outputting for transmission) may include the transceivers 232 and/or antenna(s) 234 of the BS 102 illustrated in FIG. 2 and/or transceiver 808 and antenna 810 of the communication device 800 in FIG. 8.

In some examples, means for receiving (or means for obtaining) may include the transceivers 232 and/or antenna(s) 234 of the BS 102 illustrated in FIG. 2 and/or transceiver 808 and antenna 810 of the communication device 800 in FIG. 8.

In some examples, means for receiving a MAC CE indicating a UE has detected that one or more conditions are met where the MAC CE provides assistance information comprising at least one of a TA report or information regarding potential HARQ issues for scheduling and means for allocating UL resources based on the MAC CE with the assistance information, may include various processing system components, such as: the one or more processors 820 in FIG. 8, or aspects of the BS 102 depicted in FIG. 2, including receive processor 238, transmit processor 220, TX MIMO processor 230, and/or controller/processor 240 (including MAC CE component 241).

Notably, FIG. 8 is just use example, and many other examples and configurations of communication device 800 are possible.

Example Clauses

Implementation examples are described in the following numbered clauses:

Clause 1: A method for wireless communications by a user equipment (UE), comprising: detecting one or more conditions are met for transmitting a medium access control (MAC) control element (CE) providing assistance information to a network entity for scheduling; and taking one or more actions to obtain uplink (UL) resources for transmitting the MAC CE, in response to the detection.

Clause 2: The method alone or in combination with the first clause, wherein the assistance information comprises at least one of: a timing advance (TA) report; or information regarding potential hybrid automatic repeat request (HARQ) issues.

Clause 3: The method alone or in combination with one or more of the first and second clauses, wherein the one or more actions comprise triggering a scheduling request (SR), based at least on triggering of a transmission of the MAC CE with the assistance information, when the one or more conditions are met.

Clause 4: The method alone or in combination with one or more of the first through third clauses, wherein the one or more conditions comprise at least one of: the UE meets a same condition of a buffer status report (BSR) via a logical channel associated with a highest priority or a lowest priority triggering the SR, a dynamic UL resource is not available, a configured UL resource is not available, a two-step random access channel (RACH) UL resource is not available, or an SR configuration for the MAC CE is configured.

Clause 5: The method alone or in combination with one or more of the first through fourth clauses, wherein a physical uplink control channel (PUCCH) occasion for the SR configuration associated with the MAC CE is one round trip time (RTT) earlier than an available UL resource.

Clause 6: The method alone or in combination with one or more of the first through fifth clauses, wherein the one or more actions comprise triggering a two-step random access channel (RACH) procedure, based at least on triggering of a transmission of the MAC CE with the assistance information, when the one or more conditions are met.

Clause 7: The method alone or in combination with one or more of the first through sixth clauses, wherein the one or more conditions comprise at least one of: the two-step RACH procedure is configured in an active bandwidth part (BWP), the two-step RACH procedure is configured in a default BWP, an available UL resource occasion is one round trip time (RTT) later than a two-step RACH physical uplink shared channel (PUSCH) occasion, or if a TA time alignment timer expires before an available UL occasion.

Clause 8: The method alone or in combination with one or more of the first through seventh clauses, wherein the one or more conditions are met when: a physical uplink control channel (PUCCH) resource for a scheduling request (SR) configuration is not configured in an active bandwidth part (BWP), and the two-step RACH procedure is configured in the active BWP or a default BWP.

Clause 9: The method alone or in combination with one or more of the first through eighth clauses, wherein the one or more conditions are met when: a scheduling request (SR) is triggered, a physical uplink control channel (PUCCH) resource for an SR configuration for the MAC CE is not configured in an active bandwidth part (BWP), and the two-step RACH procedure is configured in the active BWP or a default BWP.

Clause 10: The method alone or in combination with one or more of the first through ninth clauses, wherein: the one or more conditions are met when: a scheduling request (SR) is triggered, a physical uplink control channel (PUCCH) resource for an SR configuration is available, and the two-step RACH procedure is configured in an active bandwidth part (BWP) or a default BWP; and the one or more conditions comprises: the PUCCH resource for the SR configuration that is associated with a logical channel having a lowest priority is not available, the PUCCH resource for the SR configuration that is associated with a logical channel having a highest priority is not available, and a MAC entity is configured with the SR configuration for the MAC CE and the PUCCH resource for the SR configuration associated with the MAC CE is not available.

Clause 11: The method alone or in combination with one or more of the first through tenth clauses, wherein the MAC CE with the assistance information has a lower priority than a cell radio network temporary identifier (C-RNTI) MAC CE.

Clause 12: The method alone or in combination with one or more of the first through eleventh clauses, wherein the MAC CE with the assistance information has a lower priority than data from an UL common control channel (UL-CCCH).

Clause 13: The method alone or in combination with one or more of the first through twelfth clauses, wherein the MAC CE with the assistance information has a higher than all other MAC CEs except a cell radio network temporary identifier (C-RNTI) MAC CE.

Clause 14: The method alone or in combination with one or more of the first through thirteenth clauses, wherein the MAC CE with the assistance information has a higher than data from all logical channels except data from an UL common control channel (UL-CCCH).

Clause 15: The method alone or in combination with one or more of the first through fourteenth clauses, wherein the MAC CE with the assistance information has a lowest priority among all MAC CEs and logical channels, when the MAC CE with the assistance information can fit in an available transport block size (TBS).

Clause 16: A method for wireless communications by a network entity, comprising: receiving a medium access control (MAC) control element (CE) indicating a user equipment (UE) has detected that one or more conditions are met, the MAC CE providing assistance information comprising at least one of a timing advance (TA) report or information regarding potential hybrid automatic repeat request (HARM) issues for scheduling; and allocating uplink (UL) resources based on the MAC CE with the assistance information.

Clause 17: The method alone or in combination with the sixteenth clause, wherein the MAC CE providing the assistance information triggers a scheduling request (SR), when the one or more conditions are met.

Clause 18: The method alone or in combination with one or more of the sixteenth and seventeenth clauses, wherein the one or more conditions comprise at least one of: the UE meets a same condition of a buffer status report (BSR) via a logical channel associated with a highest priority or a lowest priority triggering the SR, a dynamic UL resource is not available, a configured UL resource is not available, a two-step random access channel (RACH) UL resource is not available, or an SR configuration for the MAC CE is configured.

Clause 19: The method alone or in combination with one or more of the sixteenth through eighteenth clauses, wherein the MAC CE providing the assistance information triggers a two-step random access channel (RACH) procedure, when the one or more conditions are met.

Clause 20: The method alone or in combination with one or more of the sixteenth through nineteenth clauses, wherein the one or more conditions comprise at least one of: the two-step RACH procedure is configured in an active bandwidth part (BWP), the two-step RACH procedure is configured in a default BWP, an available UL resource occasion is one round trip time (RTT) later than a two-step RACH physical uplink shared channel (PUSCH) occasion, or if a TA time alignment timer expires before an available UL occasion.

Clause 21: The method alone or in combination with one or more of the sixteenth through twentieth clauses, wherein the one or more conditions are met when: a physical uplink control channel (PUCCH) resource for a scheduling request (SR) configuration is not configured in an active bandwidth part (BWP), and the two-step RACH procedure is configured in the active BWP or a default BWP.

Clause 22: The method alone or in combination with one or more of the sixteenth through twenty-first clauses, wherein the one or more conditions are met when: a scheduling request (SR) is triggered, a physical uplink control channel (PUCCH) resource for an SR configuration for the MAC CE is not configured in an active bandwidth part (BWP), and the two-step RACH procedure is configured in the active BWP or a default BWP.

Clause 23: The method alone or in combination with one or more of the sixteenth through twenty-second clauses, wherein: the one or more conditions are met when: a scheduling request (SR) is triggered, a physical uplink control channel (PUCCH) resource for an SR configuration is available, and the two-step RACH procedure is configured in an active bandwidth part (BWP) or a default BWP; and the one or more conditions comprises: the PUCCH resource for the SR configuration that is associated with a logical channel having a lowest priority is not available, the PUCCH resource for the SR configuration that is associated with a logical channel having a highest priority is not available, and a MAC entity is configured with the SR configuration for the MAC CE and the PUCCH resource for the SR configuration associated with the MAC CE is not available.

Clause 24: The method alone or in combination with one or more of the sixteenth through twenty-third clauses, wherein a cell radio network temporary identifier (C-RNTI) MAC CE has a higher priority than the MAC CE with the assistance information.

Clause 25: The method alone or in combination with one or more of the sixteenth through twenty-fourth clauses, wherein data from an UL common control channel (UL-CCCH) has a higher priority than the MAC CE with the assistance information.

Clause 26: The method alone or in combination with one or more of the sixteenth through twenty-fifth clauses, wherein the MAC CE with the assistance information has a higher than all other MAC CEs except a cell radio network temporary identifier (C-RNTI) MAC CE.

Clause 27: An apparatus, comprising: a memory comprising executable instructions; one or more processors configured to execute the executable instructions and cause the apparatus to perform a method in accordance with any one of Clauses 1-26.

Clause 28: An apparatus, comprising means for performing a method in accordance with any one of Clauses 1-26.

Clause 29: A non-transitory computer-readable medium comprising executable instructions that, when executed by one or more processors of an apparatus, cause the apparatus to perform a method in accordance with any one of Clauses 1-26.

Clause 30: A computer program product embodied on a computer-readable storage medium comprising code for performing a method in accordance with any one of Clauses 1-26.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mm-Wave) frequencies, and/or near mmWave frequencies in communication with the UE 104. When the gNB 180 operates in mmWave or near mmWave frequencies, the gNB 180 may be referred to as an mmWave base station.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of UL resource allocation for a MAC CE in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:
    detecting one or more conditions are met for transmitting a medium access control (MAC) control element (CE) providing assistance information comprising a timing advance (TA) report to a network entity for scheduling; and
    taking one or more actions to obtain uplink (UL) resources for transmitting the MAC CE, in response to the detection, wherein the one or more actions comprise triggering a scheduling request (SR).

2. The method of claim 1, wherein the assistance information comprises information regarding potential hybrid automatic repeat request (HARM) issues.

3. The method of claim 1, wherein the one or more actions comprise triggering the SR, based at least on triggering of a transmission of the MAC CE with the assistance information, when the one or more conditions are met.

4. The method of claim 3, wherein the one or more conditions comprise at least one of:
    the UE meets a same condition of a buffer status report (BSR) via a logical channel associated with a highest priority or a lowest priority triggering the SR,
    a dynamic UL resource is not available,
    a configured UL resource is not available,
    a two-step random access channel (RACH) UL resource is not available, or
    an SR configuration for the MAC CE is configured.

5. The method of claim 4, wherein: a physical uplink control channel (PUCCH) occasion for the SR configuration associated with the MAC CE is one round trip time (RTT) earlier than an available UL resource.

6. The method of claim 1, wherein the one or more actions comprise triggering a two-step random access channel (RACH) procedure, based at least on triggering of a transmission of the MAC CE with the assistance information, when the one or more conditions are met.

7. The method of claim 6, wherein the one or more conditions comprise at least one of:
    the two-step RACH procedure is configured in an active bandwidth part (BWP),
    the two-step RACH procedure is configured in a default BWP,
    an available UL resource occasion is one round trip time (RTT) later than a two-step RACH physical uplink shared channel (PUSCH) occasion, or
    if a TA time alignment timer expires before an available UL occasion.

8. The method of claim 6, wherein the one or more conditions are met when:
    a physical uplink control channel (PUCCH) resource for an SR configuration is not configured in an active bandwidth part (BWP), and
    the two-step RACH procedure is configured in the active BWP or a default BWP.

9. The method of claim 6, wherein the one or more conditions are met when:
    the SR is triggered,
    a physical uplink control channel (PUCCH) resource for an SR configuration for the MAC CE is not configured in an active bandwidth part (BWP), and
    the two-step RACH procedure is configured in the active BWP or a default BWP.

10. The method of claim 6, wherein:
    the one or more conditions are met when:
        the SR is triggered,
        a physical uplink control channel (PUCCH) resource for an SR configuration is available, and
        the two-step RACH procedure is configured in an active bandwidth part (BWP) or a default BWP; and
    the one or more conditions comprise:
        the PUCCH resource for the SR configuration that is associated with a logical channel having a lowest priority is not available,
        the PUCCH resource for the SR configuration that is associated with a logical channel having a highest priority is not available, and
        a MAC entity is configured with the SR configuration for the MAC CE and the PUCCH resource for the SR configuration associated with the MAC CE is not available.

11. The method of claim 1, wherein the MAC CE with the assistance information has a lower priority than a cell radio network temporary identifier (C-RNTI) MAC CE.

12. The method of claim 1, wherein the MAC CE with the assistance information has a lower priority than data from an UL common control channel (UL-CCCH).

13. The method of claim 1, wherein the MAC CE with the assistance information has a higher priority than all other MAC CEs except a cell radio network temporary identifier (C-RNTI) MAC CE.

14. The method of claim 1, wherein the MAC CE with the assistance information has a higher priority than data from all logical channels except data from an UL common control channel (UL-CCCH).

15. The method of claim 1, wherein the MAC CE with the assistance information has a lowest priority among all MAC CEs and logical channels, when the MAC CE with the assistance information can fit in an available transport block size (TBS).

16. A method for wireless communications by a network entity, comprising:
    receiving a medium access control (MAC) control element (CE) indicating a user equipment (UE) has detected that one or more conditions are met, the MAC CE providing assistance information comprising at least one of a timing advance (TA) report or information regarding potential hybrid automatic repeat request (HARM) issues for scheduling, wherein the MAC CE providing the assistance information triggers a scheduling request (SR); and
    allocating uplink (UL) resources, based on the MAC CE with the assistance information.

17. The method of claim 16, wherein the MAC CE providing the assistance information triggers the SR, when the one or more conditions are met.

18. The method of claim 17, wherein the one or more conditions comprise at least one of:
the UE meets a same condition of a buffer status report (BSR) via a logical channel associated with a highest priority or a lowest priority triggering the SR,
a dynamic UL resource is not available,
a configured UL resource is not available,
a two-step random access channel (RACH) UL resource is not available, or
an SR configuration for the MAC CE is configured.

19. The method of claim 16, wherein the MAC CE providing the assistance information triggers a two-step random access channel (RACH) procedure, when the one or more conditions are met.

20. The method of claim 19, wherein the one or more conditions comprise at least one of:
the two-step RACH procedure is configured in an active bandwidth part (BWP),
the two-step RACH procedure is configured in a default BWP,
an available UL resource occasion is one round trip time (RTT) later than a two-step RACH physical uplink shared channel (PUSCH) occasion, or
if a TA time alignment timer expires before an available UL occasion.

21. The method of claim 19, wherein the one or more conditions are met when:
a physical uplink control channel (PUCCH) resource for an SR configuration is not configured in an active bandwidth part (BWP), and
the two-step RACH procedure is configured in the active BWP or a default BWP.

22. The method of claim 19, wherein the one or more conditions are met when:
the SR is triggered,
a physical uplink control channel (PUCCH) resource for an SR configuration for the MAC CE is not configured in an active bandwidth part (BWP), and
the two-step RACH procedure is configured in the active BWP or a default BWP.

23. The method of claim 19, wherein:
the one or more conditions are met when:
the SR is triggered,
a physical uplink control channel (PUCCH) resource for an SR configuration is available, and
the two-step RACH procedure is configured in an active bandwidth part (BWP) or a default BWP; and
the one or more conditions comprise:
the PUCCH resource for the SR configuration that is associated with a logical channel having a lowest priority is not available,
the PUCCH resource for the SR configuration that is associated with a logical channel having a highest priority is not available, and
a MAC entity is configured with the SR configuration for the MAC CE and the PUCCH resource for the SR configuration associated with the MAC CE is not available.

24. The method of claim 16, wherein a cell radio network temporary identifier (C-RNTI) MAC CE has a higher priority than the MAC CE with the assistance information.

25. The method of claim 16, wherein data from an UL common control channel (UL-CCCH) has a higher priority than the MAC CE with the assistance information.

26. The method of claim 16, wherein the MAC CE with the assistance information has a higher priority than all other MAC CEs except a cell radio network temporary identifier (C-RNTI) MAC CE.

27. An apparatus for wireless communications by a user equipment (UE), comprising:
a memory comprising instructions; and
a processor configured to execute the instructions and cause the UE to:
detect one or more conditions are met for transmitting a medium access control (MAC) control element (CE) providing assistance information comprising a timing advance (TA) report to a network entity for scheduling; and
take one or more actions to obtain uplink (UL) resources for transmitting the MAC CE, in response to the detection, wherein the one or more actions comprise triggering a scheduling request (SR).

28. The apparatus of claim 27, wherein the assistance information comprises information regarding potential hybrid automatic repeat request (HARQ) issues.

29. An apparatus for wireless communications by a network entity, comprising:
a memory comprising instructions; and
a processor configured to execute the instructions and cause the network entity to:
receive a medium access control (MAC) control element (CE) indicating a user equipment (UE) has detected that one or more conditions are met, the MAC CE providing assistance information comprising at least one of a timing advance (TA) report or information regarding potential hybrid automatic repeat request (HARQ) issues for scheduling, wherein the MAC CE providing the assistance information triggers a scheduling request (SR); and
allocate uplink (UL) resources, based on the MAC CE with the assistance information.

30. The apparatus of claim 29, wherein the MAC CE providing the assistance information triggers the SR, when the one or more conditions are met.

31. The apparatus of claim 27, wherein the one or more actions comprise triggering the SR, based at least on triggering of a transmission of the MAC CE with the assistance information, when the one or more conditions are met.

32. The apparatus of claim 27, wherein the one or more conditions comprise at least one of:
the UE meets a same condition of a buffer status report (BSR) via a logical channel associated with a highest priority or a lowest priority triggering the SR,
a dynamic UL resource is not available,
a configured UL resource is not available,
a two-step random access channel (RACH) UL resource is not available, or
an SR configuration for the MAC CE is configured.

* * * * *